UNITED STATES PATENT OFFICE 2,594,411

PROCESS FOR THE PREPARATION OF ALKANE SULFONIC ACIDS

John K. Fincke, Ayer, Mass., assignor to Monsanto Chemical Company, St. Louis, Mo., a corporation of Delaware No Drawing. Application February 11, 1949, Serial No. 75,982

4 Claims. (Cl. 260—513)

This invention relates to a novel and convenient method for preparing alkane sulfonic acids. More specifically the invention is directed to a method of converting bis(alkylmercapto) alkanes to the alkyl sulfonic acids by oxidation.

The preparation of sulfonic acids by reacting alkyl halides with alkali sulfites is well known. (Reference: Ann. 148, 90 (1868)). Furthermore, in copending application Serial No. 10,588, filed February 24, 1948, now Patent No. 2,547,906, there are described and claimed methods for the preparation of alkane sulfonic acids from alkyl β-mercaptoethanols by nitric acid oxidation. The purpose of this invention is to provide a novel and inexpensive method of preparation of alkane sulfonic acids from the readily available alkyl mercaptans.

The conversion of alkyl mercaptans to bis(alkylmercapto) alkanes by action of an aldehyde, such as formaldehyde and acetaldehyde, in the presence of acids is a well known reaction, which proceeds according to the following equation:

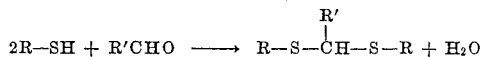

In accordance with this invention, it has been discovered that the bis(alkylmercapto) alkanes may readily be oxidized with nitric acid to form very high yields of alkyl sulfonic acids in relatively pure form. In this respect it is a definite improvement over previously available methods for the preparation of the alkane sulfonic acids. This reaction is useful in the preparation of long chain alkane sulfonic acids from the corresponding bis(alkylmercapto) alkanes. Accordingly, any alkane sulfonic acid having from six to eighteen carbon atoms in the alkyl radical, and in which the carbon atom of the alkyl radical to which the sulfur atom is attached, is either primary, or secondary, may be prepared.

The new process is practiced by the use of concentrated nitric acid, and preferably in excess over stoichiometric proportions. Although the reaction will proceed at normal room temperatures it is usually desirable to heat the reaction, for example between 40 and 80° C., at which temperature the reaction proceeds readily as evidenced by the evolution of oxides of nitrogen. The reaction is preferably conducted by adding the bis(alkylmercapto) methane to a flask containing the concentrated nitric acid. After the completion of the reaction the excess nitric acid is neutralized with a base, for example sodium hydroxide, and the product separated by crystallization from the reaction mass or by other conventional methods.

The reaction is believed to proceed in accordance with the following equation:

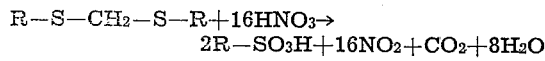

Further details of the practice of this invention are set forth with respect to the following specific example.

Example

A 500 cc., 3-necked flask was fitted with a thermometer, an efficient stirring apparatus and an air condenser. The flask was charged with 150 cc. of concentrated nitric acid (sp. gr. 1.4). The flask was then gradually charged with 30 grams of bis(n-dodecylmercapto) methane while maintaining the temperature below 50° C. by periodic cooling. After all the reagents had been charged, the reaction mass was allowed to stand for about two hours while stirring, then distilled with 250 cc. of water, and neutralized with aqueous sodium hydroxide. The solution was then cooled to 10° C. and filtered. The filtered cake was pressed dry and dissolved in 1500 cc. of hot ethanol. The resulting solution, after cooling to room temperature, was filtered to remove traces of inorganic material. The filtrate was then evaporated to 400 cc. volume, cooled to 10° C. and filtered to give 34.0 grams of the salt. The yield of solid crystalline substance was 87.2 percent. It was identified by its benzyl aniline salt as the compound having the structural formula:

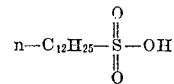

The invention is defined by the following claims.

I claim:

1. A method of preparing alkane sulfonic acids which comprises oxidizing bis(alkylmercapto) methane wherein the alkyl group has from six to eighteen carbon atoms, by means of nitric acid.

2. A method of preparing alkane sulfonic acid which comprises treating a bis(alkylmercapto) methane wherein the alkyl group has from six to eighteen carbon atoms, with concentrated nitric acid, neutralizing the reaction mass, and separating the sulfonic acid as a salt.

3. A method of preparing n-dodecyl sulfonic acid which comprises oxidizing bis(n-dodecylmercapto) methane with nitric acid.

4. A method of preparing n-dodecyl sulfonic acid which comprises treating bis(n-dodecylmercapto) methane with an excess of concentrated nitric acid, neutralizing the reaction mass and separating the resulting sulfonic acid by crystallization of the salt.

JOHN K. FINCKE.

REFERENCES CITED

The following references are of record in the file of this patent:

UNITED STATES PATENTS

| Number | Name | Date |
|---|---|---|
| 1,925,191 | Keller | Sept. 5, 1933 |
| 2,187,339 | Werntz | Jan. 16, 1940 |
| 2,338,829 | Werntz | Jan. 11, 1944 |

OTHER REFERENCES

Deutsche Chemische Gesellschaft (Berichte), vol. 8, part 1, pp. 533 (1875).